United States Patent [19]

Sasho

[11] Patent Number: 4,989,101

[45] Date of Patent: Jan. 29, 1991

[54] TAPE SYNCHRONIZING APPARATUS HAVING SELF-CORRECTING OFFSET CALCULATION

[75] Inventor: Hidehiko Sasho, Kanagawa, Japan

[73] Assignee: Sony Corporation, Tokyo, Japan

[21] Appl. No.: 392,358

[22] Filed: Aug. 11, 1989

[30] Foreign Application Priority Data

Aug. 12, 1988 [JP] Japan .................................. 63-201099

[51] Int. Cl.$^5$ ...................... H04N 5/782; G11B 27/10
[52] U.S. Cl. .................................. 360/14.3; 360/72.1
[58] Field of Search ................. 358/311; 360/13, 14.1, 360/14.2, 14.3, 72.1, 72.2, 73.12, 73.13, 72.3

[56] References Cited

U.S. PATENT DOCUMENTS 4,532,560 7/1985 Williams .............................. 360/72.3
4,663,679 5/1987 Sekiguchi et al. ................ 360/73.13

*Primary Examiner*—Robert L. Richardson
*Attorney, Agent, or Firm*—Hill, Van Santen, Steadman & Simpson

[57] ABSTRACT

A tape synchronizing apparatus for a tape reproducer using a tape with information signals and time code signals recorded thereon and serving to reproduce such signals from the tape. When attaining synchronism with a reference time code before return of a rewound tape to a target in-point, there is calculated, at the instant of the tape speed rise to a predetermined constant speed, the difference between the respective remaining times of both the read and reference time codes until the target in-point, and the preset value of the reference time code at the tape rewind instant is further offset by the difference from the time period corresponding to the tape rewind, so that the difference is reduced substantially to zero at the next tape speed rise, thereby shortening the time required for synchronization (phase modification).

6 Claims, 4 Drawing Sheets

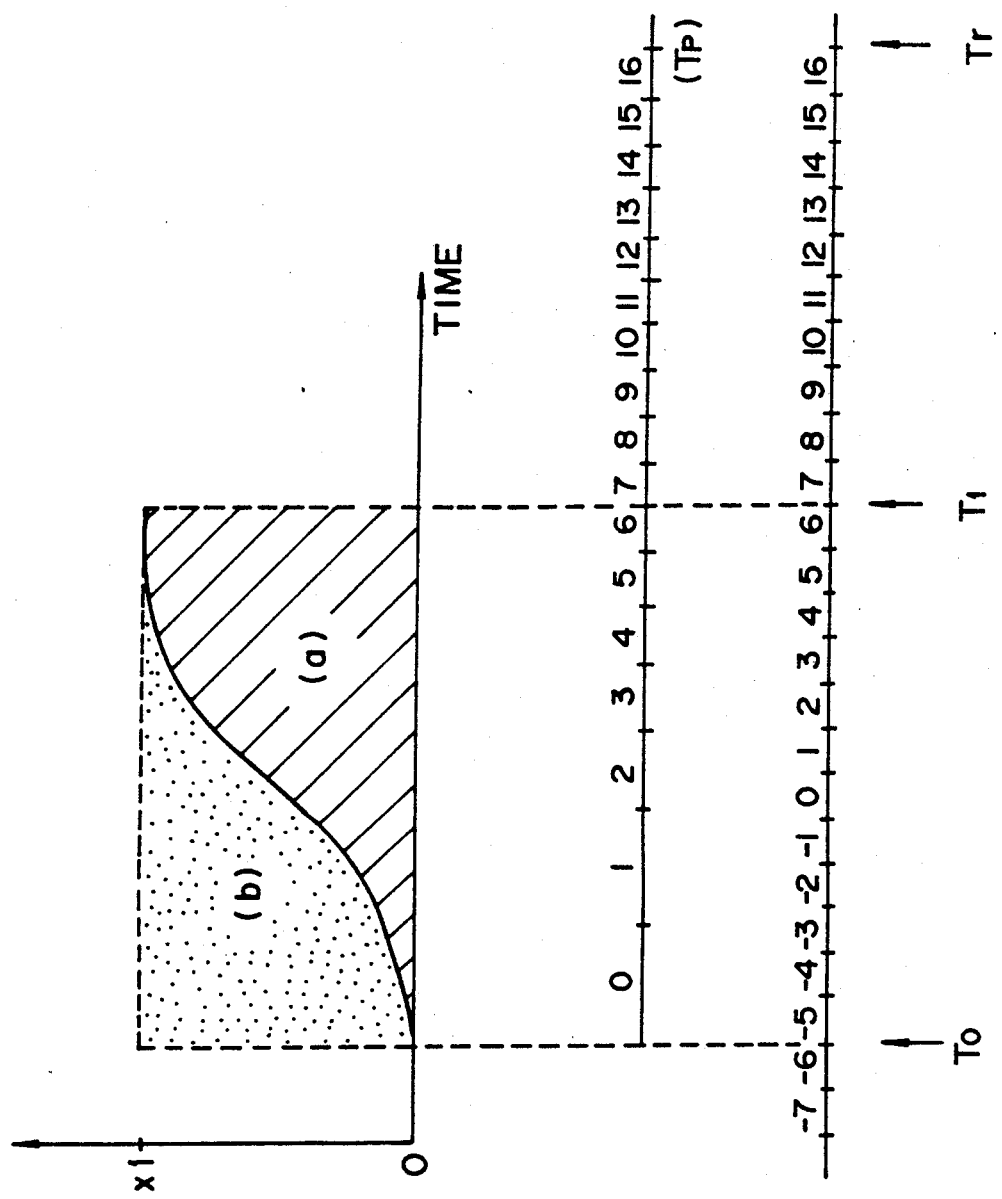

TAPE SYNCHRONIZING APPARATUS HAVING SELF-CORRECTING OFFSET CALCULATION

BACKGROUND OF THE INVENTION

1. Field of the Invention

The present invention relates to a tape synchronizing apparatus for a tape reproducer and, more particularly, to an apparatus adapted for use in an editing system.

2. Description of the Prior Art

In a video tape editing operation, when a desired video image on a recorded original tape is to be inserted into a predetermined portion of an edit tape for example, time codes respectively representing the beginning of the desired video image on the original tape (edit point on the original tape side) and the begining of the predetermined portion of the edit tape (edit point on the edit tape side) are designated in an editing apparatus. Then the tapes loaded in the individual tape reproducers are rewound by predetermined amounts from the designated time codes, and reproduction is started at such position. In this stage of operation, a reference time counter is set at a value anterior to a certain target instant for a time corresponding to the rewind amount and serves to measure the reference time simultaneously with start of the tape transport motion.

While the time codes are detected from the individual tapes before arrival at the edit point, the difference between the detected time codes and the respective designated edit-point time codes is calculated, and then the motions of both the original tape and the edit tape are controlled (synchronized) in such a manner that each difference coincides with the remaining time of time of the reference time counter. And when the remaining time of the reference time counter has finally become zero to indicate arrival of each tape at the designated edit point, the video recorder with the edit tape is placed in a recording mode to record the signal reproduced from the original tape.

Similarly, when video images obtained from the original tape are used for broadcasting, time codes are designated with regard to a desired reproduction instant and the beginning of a desired video image on the original tape. Then the original tape is rewound by a predetermined amount and begins to be reproduced at an instant anterior to the desired reproduction instant for a predetermined time. And synchronization is performed in relation to the reference time counter so that proper reproduction can be started without any disorder at the desired reproduction instant.

In the initial stage of such synchronization, the reproduced time code of each tape is delayed from the reference time before the original tape or the edit tape completely rises to the normal steady or constant speed thereof from the halt state. For the purpose of canceling such delay, there is preset in the reference time counter a value further anterior to the value corresponding to the rewind amount of each tape.

The tape-speed rise time varies depending on the type of each video tape recorder/reproducer or on individual apparatus even when the type is the same, and also on the length of each cassette tape (diameter of each reel), tape positions (beginning, middle and end), ambient conditions, total operation time period and so forth.

Therefore it has been necessary to select the greatest value as the delay time due to the rise of the tape speed. Accordingly, at the instant the tape speed has risen to the normal steady or constant speed, there is generally induced that the time code difference up to the edit point on the tape has a deviation from the remaining time in the reference time counter. And consequently a sufficient tape rewind amount needs to be taken for phase modification to attain synchronism. If the tape rewind amount is not sufficient, there may occur a fault that complete phase modification fails to be achieved at the edit point.

OBJECTS AND SUMMARY OF THE INVENTION

It is therefore an object of the present invention to provide a novel tape synchronizing apparatus capable of avoiding the above-described difficulties encountered with the prior art.

Another object of the invention is to provide a tape synchronizing apparatus which can shorten the time required for a synchronizing operation.

A further object of the invention is to provide a tape synchronizing apparatus which maintains the tape synchronizing operation free from any fluctuation of the required time while stabilizing the tape speed.

And still another object of the invention is to provide a tape synchronizing apparatus which can achieve complete synchronization at an in-point with a minimum tape rewinding amount.

According to one aspect of the present invention, there is provided a tape synchronizing apparatus for a tape reproducer which uses a tape having information signals and time code signals recorded thereon and is adapted to reproduce the information signals and the time code signals from the tape. The apparatus comprises means for generating and storing a first time code corresponding to an in-point after which the reproduced information signal becomes effective; means for rewinding the tape to a preroll point advanced from the in-point by a predetermined amount; means for generating a reference time code incremented in accordance with a reference time; means for generating and storing a first reference time code corresponding to the in-point; means for presetting the reference time code generating means to a second reference time code advanced from the first reference time code by the sum of the time corresponding to the predetermined amount and an offset amount; means for calculating, at an instant after the tape speed becomes constant, the time difference between a first remaining time, which is existent from the read time code at the instant to the first time code corresponding to the in-point, and a second remaining time existent from the reference time code generated by the reference time code generating means at the instant to the first reference time code; means for correcting the offset amount in response to the time difference generated from the calculating means.

The above and other objects, features and advantages of the present invention will be apparent in the following detailed description of an illustrative embodiment of the invention which is to be read in connection with the accompanying drawings.

BRIEF DESCRIPTION OF THE DRAWINGS

FIG. 2A, 2B and 3A, 3B are time charts of phase modification for tapes; and

DESCRIPTION OF THE PREFERRED EMBODIMENT

Figure 1:
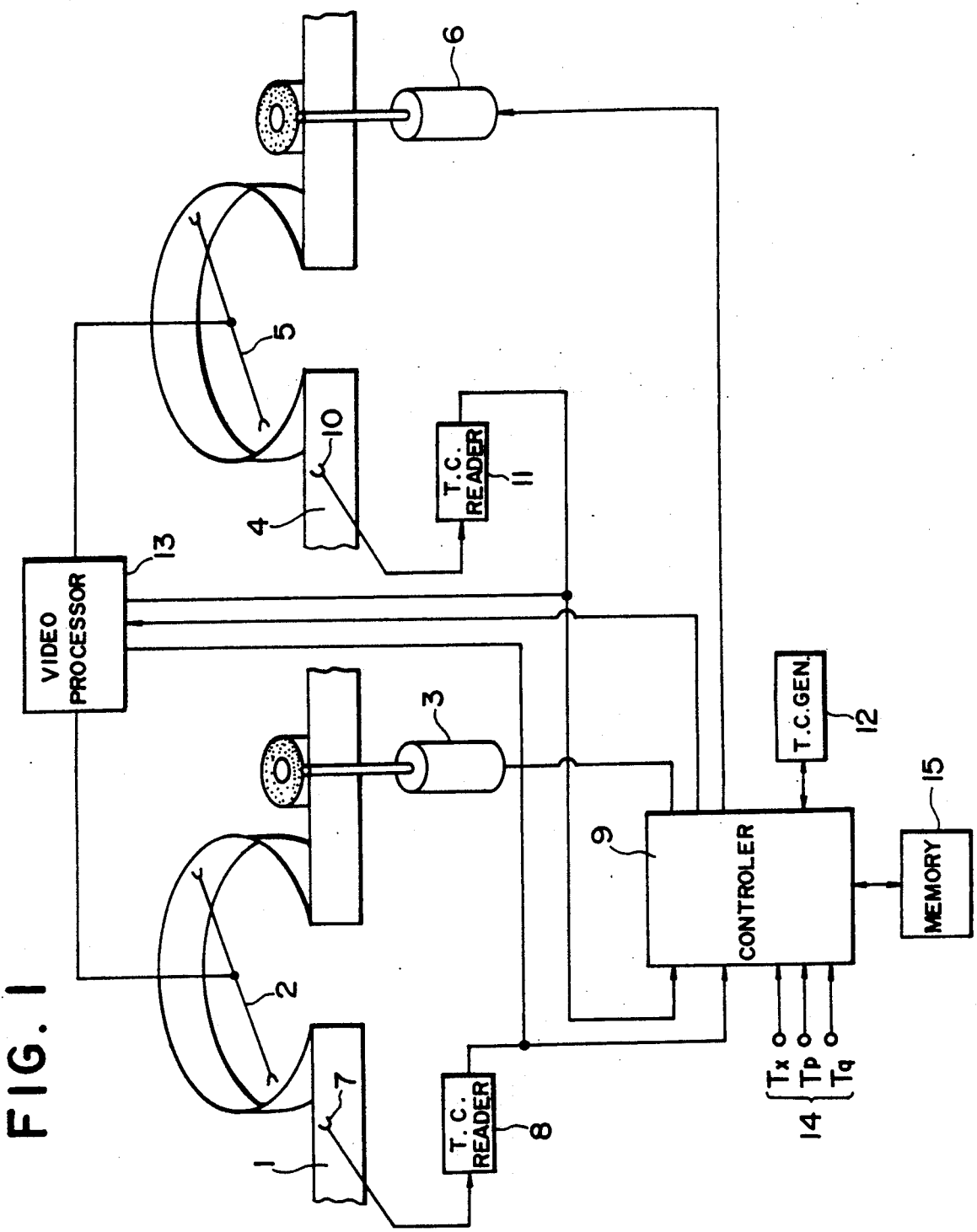
FIG. 1 is a block diagram of a video editing system where the present invention is applied.

FIG. 1 is a block diagram of an editing system employing two video tape recorders. An original tape 1 loaded in the reproducing-side VTR is wound around a rotary drum and is scanned for reproduction by a rotary head 2 while being driven forward by a capstan motor 3. The reproduced signal is fed via a video processing circuit 13 to a rotary head 5 in the recording-side VTR and then is recorded on an edit tape 4 driven forward by a capstan motor 6.

The time codes of individual frames recorded along the edges of the original tape 1 and the edit tape 4 are reproduced by means of reproducing heads 7 and 10 respectively and are supplied to a control circuit 9 after being read by time code readers 8 and 11. A reference time code generator 12 is provided to serve as a reference time counter and feeds each reference time code to the control circuit 9. The control circuit 9 receives, at its terminals 14, individual time codes relative to a desired reproduction instant Tx, an edit point Tp (reproduction start point) on the original tape 1, and an edit point Tq (recording start point) on the edit tape 4. Such time codes are stored in a memory 15.

FIG. 2 is a time chart showing a phase modifying operation per frame, wherein A stands for the speed of the original tape 1 on the reproducing side; B for reproduced time codes on the tape 1; and C for reference time codes obtained from the time code generator 12.

For example, a numerical value "16" is designated as the time code for the edit point Tp of the original tape 1. The original tape 1 is rewound by a predetermined amount (16 in this case) required for phase modification, and reproduction is started from the time code "0". Meanwhile a desired value, e.g. "16", is designated as the target $T_t$ of the reference time code, and the reference time code generator 12 is preset at a value "−5" which is anterior by the sum of "16" equivalent to the rewind amount and a delay amount "5" required for the tape to rise to its normal steady or constant speed.

When reproduction is started at an instant $T_0$, the time code generator 12 counts incrementally frame by frame, and the tape speed rises to its normal steady state at an instant $T_1$ of the time code "6" after the lapse of 11 frames, as illustrated in FIG. 2A. In this stage, the reproduced time code of the original tape 1 advances to "6". That is, the integral amount denoted by (a) in FIG. 2A represents the advanced amount of the tape 1, and remaining (b) represents the amount delayed from the reference time. Since the delay amount (b) is canceled by the offset "−5" of the preset value in the reference time code generator 12, the respective remainders of the reproduced time code and the reference time code to the targets are rendered substantially equal to each other at the instant $T_1$.

After the instant $T_1$, phase modification is performed and the speed control of the capstan motor 3 in the reproducing-side VTR is executed by the control circuit 9 in such a manner that the respective remainders become zero at the instant $T_r$. Meanwhile in the recording-side VTR also, phase modification is performed with respect to the reference time code exactly by the same process, and the operation is switched to a recording mode at the edit point Tq.

The delay amount (b) shown in FIG. 2A is a value inherent in each video tape recorder and varies with the lapse of time. Therefore, a learning routine is prepared in the control circuit 9 for the offset to cancel the delay amount (b), thereby executing optimal control.

Figures 3A, 3B:
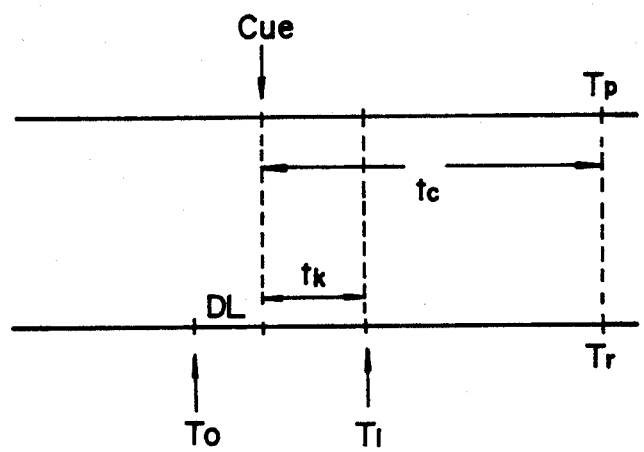
Figure 4:
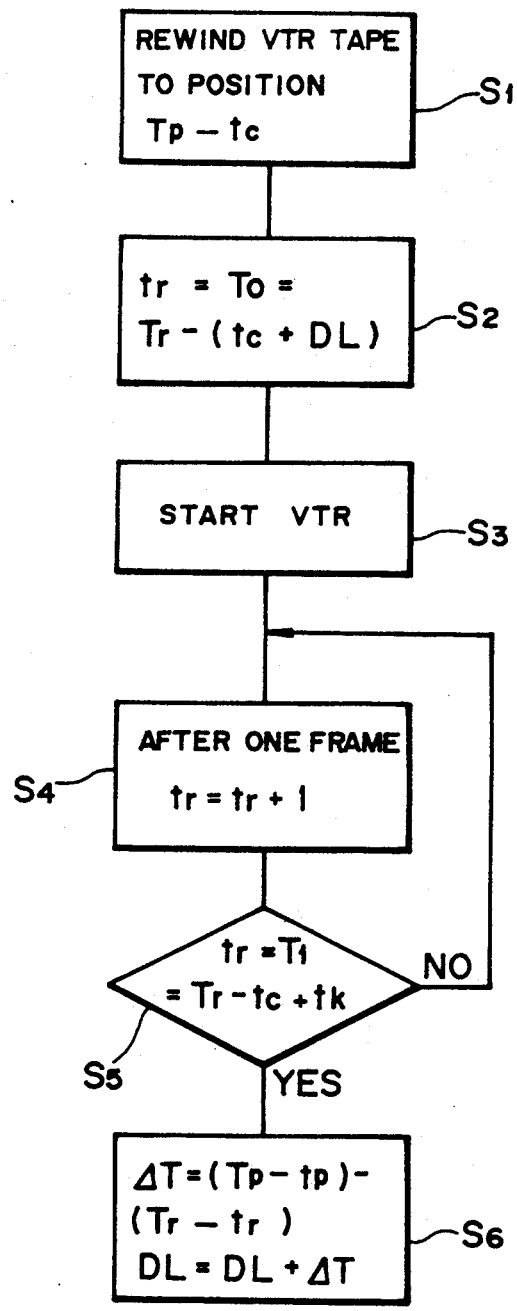
FIG. 4 is a flow chart showing a learning algorithm for the delay in the tape-speed rise.

FIG. 3 is a time chart showing a generalized graphic representation of the phase modification in FIG. 2, and FIG. 4 is a flow chart of a learning routine. First in a step S1, the tape loaded in the reproducing-side VTR is rewound to a cue-up point Cue denoted by the time code of Tp (edit point)—$t_c$ (fixed rewind amount). Then in a step S2, there is preset a value $T_0$ anterior to the time code $T_r$ of the reference time code generator 12 by the sum of $t_c$ (rewind amount)+DL (offset amount). The offset DL is driven by an initial value as "5" for example. Subsequently the VTR is started in a step S3.

In next steps S4 and S5, the reference time code $t_r$ is counted up frame by frame until arrival at the instant T1 or $Tr-t_c+t_k$. In this chart, $t_k$ denotes a time width required for the tape in the reproducing VTR to rise to a normal steady speed, and it is given by a fixed value as "6" for example in FIG. 2.

Upon arrival of the reference time code at the instant T1, the tape speed is controlled for phase modification in such a manner that the remaining time Tp−tp until the target point $T_p$ of the reproducing VTR becomes equal to the remaining time Tr−$t_r$ until the target point Tr of the reference time code.

And simultaneously in a step S6, a calculation is executed to obtain the difference $\Delta T$ between the respective remaining times Tp−tp and Tr−$t_r$ at the instant T1. The difference $\Delta T$, which should be zero fundamentally, appears as an inherent error of the rise delay due to some variations in the VTR. Therefore, such difference is corrected by adding the initial value of the offset amount DL (or delay cancel amount).

The offset amount DL thus corrected is stored in the memory 15 and is used for the next editing operation so as to cancel the inherent error $\Delta T$. Accordingly, a learning routine is so prepared as to substantially equalize the respective remaining times mutually at the instant T1 of the tape speed rise up to the normal steady state, whereby the phase modification until the target point posterior to the instant T1 can be performed in a short period of time.

In the step S6, it is preferred that the offset DL be corrected by determining the inherent error of the rise delay on the basis of the average of plural values relative to the difference $\Delta T$ between the respective remaining times Tp−tp and Tr−$t_r$ of the reproduced time code and the reference time code. Since the rise delay is different depending also on the tape length (reel diameter) or the tape speed (double speed, triple speed and so forth), a plurality of offset amounts DL may be previously stored and proper one of them may be selected in accordance with individual requirement.

In an arrangement where the polarity of the difference $\Delta T$ is detected and the offset amount DL is weighted for correction by +1, −1 or more correspondingly to the detected polarity, the inherent error is accumulated after repetition of such operation, so that it becomes possible to eliminate any random delay time dependent on the tape reproducing position to consequently obtain an offset amount DL approximate to the actual value.

According to the present invention, despite any inherent variation or secular change existent in the drive mechanism of the video tape recorder or reproducer with regard to the tape-speed rise delay, proper tape control is achievable through learning the delay without being affected by such variation and so forth, whereby a coincidence is attained, at the instant of the tape speed rise, between the remaining times of the reproduced time code and the reference time code until the respective targets. Consequently, desired synchronization can be carried out with remarkable facility for the reproduced and reference time codes after rise of the tape speed. Thus, even if the tape rewind amount is reduced to its necessary minimum, the required synchronism is still attainable without any impediment before arrival at the target point, hence enhancing the temporal efficiency and certainty in the synchronizing operation.

What is claimed is:

1. A tape synchronizing apparatus for a tape reproducer which uses a tape having information signals and time code signals recorded thereon and is adapted to reproduce said information signals and time code signals from said tape, said apparatus comprising:
   means for generating and storing a first time code corresponding to an in-point after which the reproduced information signal becomes effective;
   means for rewinding said tape to a preroll point advanced from said in-point by a predetermined amount;
   means for generating a reference time code incremented in accordance with a reference time;
   means for generating and storing a first reference time code corresponding to said in-point;
   means for presetting said reference time code generating means to a second reference time code advanced from said first reference time code by the sum of the time corresponding to said predetermined amount and an offset amount;
   means for calculating, at an instant after the tape speed becomes constant, the time difference between a first remaining time interval, which is existent from the time code which is read at said instant up to the first time code corresponding to said in-point, and a second remaining time existent from the reference time code generated by said reference time code generating means at said instant to said first reference time code; and
   means for correcting said offset amount in response to the time difference generated from said calculating means.

2. A tape synchronizing apparatus according to claim 1, wherein a recording of said reproduced information signals by a tape recorder is started at said in-point.

3. A tape synchronizing apparatus according to claim 1, wherein a broadcasting of said reproduced information signals is started at said in-point.

4. A tape synchronizing apparatus according to claim 1, wherein at least after said time interval instant, the tape speed is controlled by the output of a comparison between said read time code and the reference time code generated by said reference time code generating means.

5. A tape synchronizing apparatus according to claim 1, wherein said calculating means include means for averaging a plurality of the time differences in a plurality of synchronizing operations.

6. A tape synchronizing method for a tape reproducer which uses a tape having information signals and time code signals recorded thereon and is adapted to reproduce said information signals and time code signals from said tape, said method comprising the steps of:
   generating and storing a first time code corresponding to an in-point after which the reproduced information signal becomes effective;
   rewinding said tape to a preroll-point advanced from said in-point by a predetermined amount;
   generating a reference time code incremented in accordance with a reference time;
   generating and storing a first reference time code corresponding to said in-point;
   presetting the generation of said reference time code to a second reference time code advanced from said first reference time code by the sum of the time corresponding to said predetermined amount and an offset amount;
   calculating, at an instant after the tape speed becomes constant, the time difference between a first remaining time, which is existent from the time code which is read at said instant to the first time code corresponding to said in-point, and a second remaining time existent from the reference time code generated at said instant to said first reference time code; and
   correcting said offset amount in response to the time difference generated in said calculating step.

* * * * *